United States Patent [19]
Rao et al.

[11] 3,930,071
[45] Dec. 30, 1975

[54] PROCESS FOR COATING THE RUBBING SURFACES OF THE SEAL OF THE GAS TURBINE REGENERATOR

[75] Inventors: V. Durga Nageswar Rao, Woodhaven; Yeshwant P. Telang, Grosse Ile, both of Mich.

[73] Assignee: Ford Motor Company, Dearborn, Mich.

[22] Filed: Nov. 14, 1973

[21] Appl. No.: 415,897

[52] U.S. Cl. ............... 427/203; 165/9; 264/135; 277/96.2; 427/34; 427/290; 427/370; 427/405; 427/409; 428/450; 428/538
[51] Int. Cl.² ............... B05D 1/36; B05D 3/12
[58] Field of Search ......... 161/182, 213; 29/148.45; 165/9; 277/96 R, 96.2, 235 A; 117/26, 71 M, 75; 427/196, 203, 370, 405, 409, 34, 290; 428/450, 538; 264/135

[56] References Cited
UNITED STATES PATENTS

| | | | |
|---|---|---|---|
| 2,757,907 | 8/1956 | Williams | 165/9 |
| 3,057,604 | 10/1962 | Bubniak et al. | 165/9 |
| 3,512,790 | 5/1970 | Mancel | 277/96 R X |
| 3,542,122 | 11/1970 | Bracken | 277/96 R X |
| 3,576,208 | 4/1971 | Cassidy | 277/96 R X |
| 3,647,228 | 3/1972 | Cassidy | 277/96 R |
| 3,659,861 | 5/1972 | Rao | 277/96 R |
| 3,743,008 | 7/1973 | Zeek et al. | 219/76 X |
| 3,756,849 | 9/1973 | Buchholz | 117/71 M X |
| 3,785,856 | 1/1974 | Gotoh | 277/235 A X |
| 3,787,363 | 1/1974 | Stainland et al. | 161/213 X |

*Primary Examiner*—William D. Martin
*Assistant Examiner*—Shrive P. Beck
*Attorney, Agent, or Firm*—Donald J. Harrington; Keith L. Zerschling

[57] ABSTRACT

A method for preparing and applying a thermoplastic resin base coating to the surfaces of a seal assembly for a rotary regenerator in a gas turbine engine, the coating comprising a high-temperature, thermoplastic resin filled with a lubricating material, said method including preparation of a bond coating on the surface of a seal assembly shoe portion, preparation of coating material having a percentage of graphite and a percentage of boron nitride, dissolving the coating material in a suitable solvent to form a paste which may be applied to a seal shoe portion of the seal assembly used with the ceramic rotary regenerator matrix, curing the coating material and finish grinding the seal assembly following curing whereby the seal assembly is conditioned for operation with reduced friction and improved sealing characteristics at the elevated temperatures that are characteristic of gas turbine regenerator installations.

3 Claims, 5 Drawing Figures

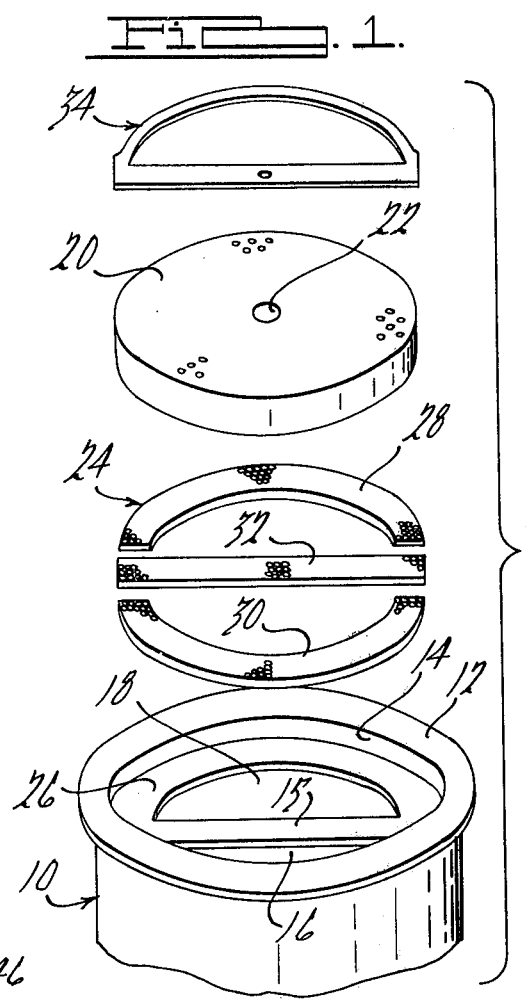
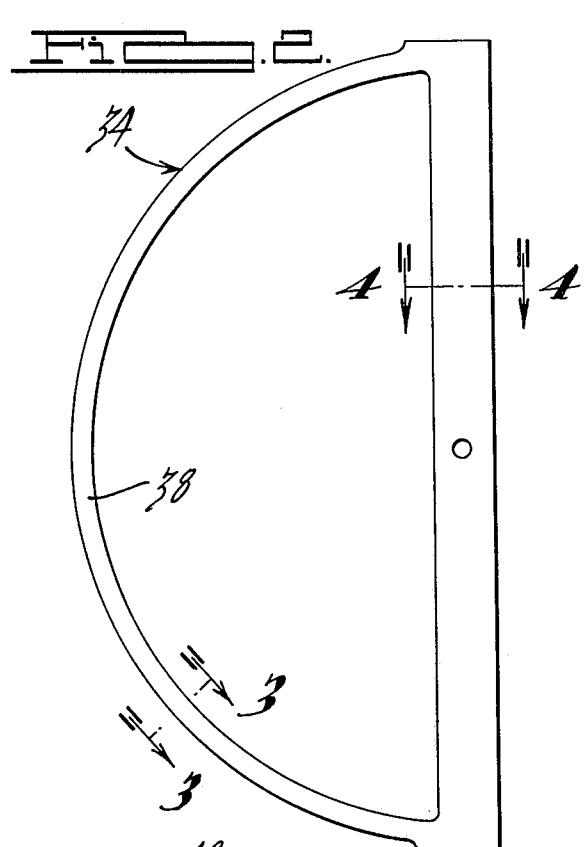
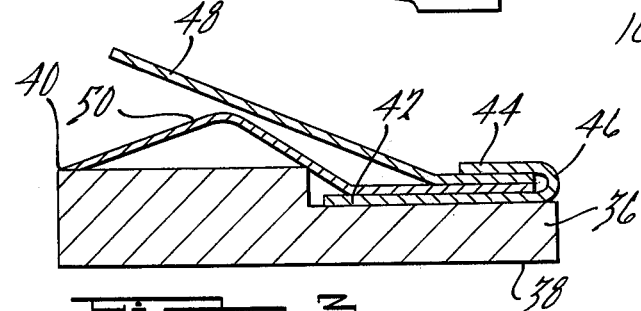
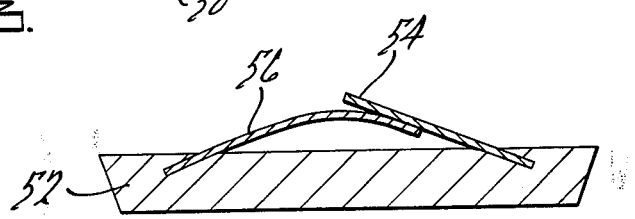
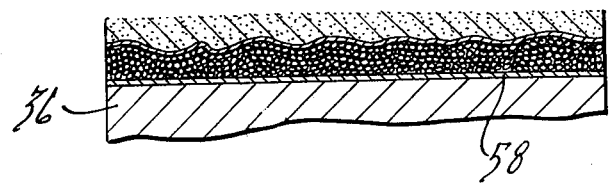

PROCESS FOR COATING THE RUBBING SURFACES OF THE SEAL OF THE GAS TURBINE REGENERATOR

GENERAL DESCRIPTION OF THE INVENTION

The improved coating process of our invention may be applied to the sealing surfaces of a rotary regenerator for a gas turbine engine such as that disclosed in U.S. Pat. No. 3,659,861, which is assigned to the assignee of this invention. The gas turbine engine shown in that patent comprises a regenerator housing that defines a first semicircular gas flow passage for admitting compressed intake air for the gas turbine engine and a second semicircular gas flow passage for conducting exhaust gases from the downstream side of the power turbine of the engine. A rotary ceramic regenerator core is disposed over the semicircular openings and is adapted to rotate about either a floating or a fixed axis. The heat stored in the regenerator core due to flow of gases through the second semicircular regenerator flow passage is transferred to the relatively cool compressed intake air which passes through another segment of the regenerator core. In this way thermal energy that otherwise would be exhausted from the engine is recovered and transmitted to the intake air flow of the gas turbine air flow cycle thereby increasing the thermal efficiency of the engine.

A first rotary regenerator seal is disposed between the rotary regenerator core and the adjacent sealing surfaces of the gas turbine housing. This seal, which will be described hereafter as a lower seal assembly, comprises two C-shaped sections and a single crossarm section, the latter providing a separation between the flow passages defined by the two semicircular openings. A D-shaped upper seal assembly is positioned on the upper side of the surface of the ceramic regnerator core and it is adapted to provide a seal between the regenerator cover which is bolted or otherwise secured to the gas turbine housing and the flow passage for the exhaust gases.

The particular seal construction that will be described particularly in this specification has a flat sealing surface that engages the adjacent surface of the rotary regenerator core. The flat seal surface is on a shoe to which a low friction coating material is applied. A bond coating is formed between the shoe surface and the low friction coating.

The seal coating comprises a high temperature thermoplastic resin, which will be described in this specification, and lubricants that fill the resin. Preferably the lubricants are graphite or boron nitride or a mixture of the two. Under some conditions, other materials might be used successfully, such as $MoS_2$ and $FeS$. A filler material of specified percentages may be used in addition to the lubricant. The filler material may be inertfiberous material, such as glass fibers, asbestos fibers, etc., to provide firmness and rigidity to the coating.

After surface preparation, the coating is prepared by thoroughly drying and weighing the materials in the required proportions. If boron nitride and graphite are used together, they are thoroughly mixed and are ball milled. The resin used in the process may be a powdered polymer such as the well known Astrel polymer 360 manufactured by the Minnesota Mining and Manufacturing Company of Delaware. Reference may be made to British Patent No. 1,060,546, dated Mar. 8, 1967, for a description of this polymer. It is described also in a publication entitled "Polyarylsulfones: Synthesis and Properties" by H. A. Vogel, which was published in *Polymer Preprints*, Vol. 10, No. 1., April, 1969. The boron nitride and the graphite are mixed and added to the resin which is dissolved in a rapid drying solvent, such as dimethyl acetamide, forming a thick, syrup-like paste. The paste then is applied to the sealing surfaces. A bond coating of nickel chrome alloy is sprayed onto the surface of the shoe prior to application of the paste. The seal with the coating applied is precured and pressure laminated at specified temperatures. After cooling, the surface of the seal is ground to a smooth finish. If added thickness is required, the coating step may be repeated.

BRIEF DESCRIPTION OF THE FIGURES OF THE DRAWING

FIG. 1 shows in schematic form an exploded assembly view of a regenerator and regenerator housing for a gas turbine engine.

FIG. 2 is a plan view of a D-shaped upper seal assembly.

FIG. 3 is a cross sectional view taken along the plane of section line 3—3 of FIG. 2.

FIG. 4 is a cross sectional view taken along the plane of section line 4—4 of FIG. 2.

FIG. 5 is a schematic cross sectional view shown in a large form indicating the composition of the coating for the friction surfaces of the shoe of the seal assembly.

PARTICULAR DESCRIPTION OF THE INVENTION

Shown in FIG. 1 is a portion of a gas turbine engine housing that encloses a gas turbine regenerator. It is designated by reference character 10. The upper portion of the housing defines two substantially semicircular gas flow passages. These are identified by reference characters 16 and 18. Passage 16 accommodates the flow of compressed intake air to the combustion chamber inlet and passage 18 accommodates the flow of the exhaust gases on the downstream side of the power turbine.

A ceramic regenerator core 20 is fitted in the regenerator core opening 14. It is adapted to rotate about a central axis 22. Suitable drive means, not shown, are used for powering the regenerator. The generator has axial flow passages which accommodate intake air flow through one segment. As the exhaust gas regenerator core is rotated, the heat absorbed by the regenerator core is transferred to the intake air so that thermal energy can be recovered.

A seal assembly designated generally by reference character 24 is situated between an internal seal shoulder 26 and a lower surface of the regenerator core 20. The seal assembly comprises two C-shaped portions situated in end-to-end relationship as shown and a cross arm portion extending generally diametrically. The C-shaped portions are identified by reference characters 28 and 30, and the cross arm portion is identified by reference character 32.

A D-shaped seal assembly 34 is adapted to engage the upper surface of the regenerator core 20. It is disposed between the regenerator core and a cover assembly which is bolted to the rim 12 of the housing 10. The cover forms a portion of the intake air flow passage as well as a portion of the exhaust gas flow passage. The seal assembly 34 separates the intake air flow passage in the cover from the exhaust flow passage in the cover. The improved method for preparing and coating the seal assemblies described in this specification may be applied to either the lower seal assembly 24 or the upper seal assembly 34.

FIG. 2 shows the upper seal assembly in plan view. The seal assembly comprises a metallic substrate 36 which has a surface 38 to which the lubrication and low friction coating may be applied. The upper surface of the substrate 36 is stepped to provide surface portions 40 and 42. A leaf type seal element positioned on the surface portion 42 comprises a retainer 46 which secure the outer margins of a flexible leaf element 48. It secures also a flexible backup element 50 disposed under the leaf element 48, the latter engaging an adjacent seal surface on the cover that encloses the regenerator core 20.

The construction of the cross arm portion of the seal can be seen best by referring to FIG. 4. It includes a metallic substrate 52 which is formed with a leaf type seal element 54, one end of which is secured to the substrate 52. A leaf type spring element 56 having one end secured to the substrate 52 engages the undersurface of the seal element 54 so that the latter may sealingly engage the cooperating seal shoulder of the regenerator cover. The coating that is applied by using our improved method provides a low friction sealing surface on the substrate or shoe 36 and the shoe 52. The coating comprises a high temperature thermoplastic resin such as polymer 360, known as Astrel, manufactured by Minnesota Mining and Manufacturing Company. The sealing surface of the seal must be prepared prior to the application of the coating. To remove any oxidation that exists on the surface, the surface is cleaned by a suitable cleaning process. For example, it may be cleaned by using a rubber bonded abrasive wheel or emery paper. The surface also should be washed with a detergent and rinsed with hot water to remove any foreign material. Rinsing with isopropyl alcohol or some other suitable solvent may be needed. After the surface is cleaned and degreased it should be grit blasted using clean, 20 to 50 mesh, hard ceramic grit. To insure cleanliness the grit should be changed frequently, at least once every 50 hours of use. The grit blast pressure should be adjusted to obtain a coarse surface texture without inducing excessive distortion or warpage of the shoe.

The grit blasted surface then should be rinsed with isopropyl alcohol or equivalent and dried by means of a filtered, oil-free air blast to remove any particles clinging to the surface. The surface then is ready for plasma spraying.

To avoid contamination, the plasma spraying operation should be done soon after the grit blasting operation. The seal assembly should be cooled by means of compressed air to prevent an undue temperature rise during the coating operation. The shoe temperature should not exceed 200° during the coating operation.

The interface coating between the lubrication and sealing coating and the shoe surface that is applied by spraying establishes a bond between the shoe or substrate and the ceramic coating that is applied in subsequent steps. The coating is comprised of coarse powder of 80% by weight of nickel and 20% by weight of chrome alloy. A thickness of 0.004 to 0.005 inch maximum should be maintained. In FIG. 5 the bond coating is identified by reference character 58 and the substrate to which it is applied is identified by reference character 36.

The polymer 360, shown at 61, is dried at approximately 300°F for approximately 12 hours. The resin then is dissolved in dimethyl acetamide to make a thick syrupy paste. Boron nitride and graphite are weighed out and are ball milled together. The boron nitride and the graphite then are added together, 40% by weight of the mix being polymer, 20% by weight being boron nitride and 40% by weight being graphite. The consistency of the mix should be sufficiently thin to permit it to be spread by a spatula, a brush or some similar instrument. Dimethyl acetamide may be added to provide the proper thin paste consistency.

A thin coat of polymer resin 61 is applied to the seal surface and the assembly then is dried in an oven at 200°F for ten minutes. The seal assembly then is removed from the oven and allowed to cool to room temperature. The paste then is spread over the entire surface using a brush or spatula. The assembly then is dried at 250° to 300°F for at least 15 minutes. The seal is cooled to room temperature and stored in a moisture free environment. If more thickness is desired the process can be repeated.

The seal then is placed in an appropriate mold. A large quantity of polymer resin powder 59 is spread over the seal surface in the mold cavity. If desired, a small amount of isopropylalcohol may be mixed with the powder to facilitate distribution and compacting. The top portion of the die is placed in the mold over the powder and the entire mold is transferred to the lower platen of a press which is maintained at a temperature of approximately 690°. A top platen, which also is maintained at a temperature of approximately 690° is lowered in the mold and a pressure of 1400 psi is applied. The mold temperature should not exceed 700° and the pressing time may be 5 to 15 minutes. The mold then is cooled to a temperature below 450°F under the same pressure. The mold then is removed and cooled as rapidly as practical to remove the seal from the mold. The seal then is cooled to room temperature.

It is possible to apply the lubrication and seal coating in powder form to the bond coating by using a closed, heated pressure mold. In this case the powder particle size becomes important. The boron nitride portion of the powder should not be larger than about 80 microns particle size, the polyarylsulfone powder particle size should be less than about 100 microns and the graphite powder particles should be less than about 70 microns. The powder matrix, in the aforesaid proportion by weight, are laminated to the bond coating by placing the seal in a closed die-mold and applying a pressure of about 200 – 1500 psi at about 500° – 800° F. The mold and die are cooled and the coating is finish ground.

In some instances when a seal portion will not be exposed in operation to temperatures in excess of 650°, a mixture of a polymer resin and graphite may be used without boron nitride. The resin to graphite mixture should be about 35 to 65 percent. The polymer will prevent the graphite from breaking down or decomposing until a temperature of about 650° is achieved. The coefficient of friction of this mixture at 500° is 0.02 and the wear rate is approximately ½ mil per one hundred hours. At 650° the coefficient of friction increases to as high as 0.08 and the wear rate increased to 1 mil per one hundred hours. If higher temperatures are present boron nitride should be used also. The ratio of weights of polymer to boron nitride to graphite should be approximately 40%: 20%: 40%. The boron nitride in the mixture stabilizes the polymer and the polymer will keep the coating effective to a temperature of about 750°F. At a temperature of 700° the polymer-boron nitride-graphite mixture has a coefficient of friction of about 0.04 and a wear rate of ½ mil per one hundred hours. At 750° the coefficient of friction rises to 0.06 and the wear rate increases to 3 mils per one hundred hours. These coefficients and these wear rates are measured when the coatings run against a rotary ceramic regenerator core as described in the introductory portions of this specification.

In an alternative technique the coating compound may be rolled into sheets rather than spread on the surface of the seal. The rolling operation can be carried out until the desired thickness is achieved. The rolled material then can be cut with a pattern and then placed on the surface of the seal. The seal material can be secured to the metal surface of the seal by applying a bond coat and then pressure forming in a heated pressure mold.

What we claim and desire to secure by U.S. Letters Patent is:

1. A method for forming a low friction seal coating on a rubbing seal surface for a ceramic regenerator core comprising the steps of mixing a polyarysulfone polymer with a graphite lubricant with a proportion of approximately 35% polymer by weight and 65% graphite by weight in a solvent, preparing a bond coating on the seal surface by applying a mixture of approximately 80% nickel by weight and 20% chromium by weight alloy powder to the surface of the seal, applying a thin coating of the polymergraphite mixture to the bond coating, drying the solvent from the polymer-graphite coating at approximately 250° to 300°F for at least 15 minutes, curing the coating at approximately 400°F to 500°F for approximately one-half hour to one hour and pressure laminating the coating at a temperature of approximately 500°F to 800°F for approximately one-half hour to one hour with a pressure of approximately 800 to 1500 psi, and slowly cooling the coating and grinding the coating to a smooth surface finish.

2. A method for forming a low friction seal coating on a rubbing seal surface for a ceramic regenerator core comprising the steps of mixing a polyarylsulfone with a graphite-boron nitride lubricant with a proportion of approximately 40% polymer, 40% graphite by weight and 20% boron nitride by weight, preparing a bond coating on a sealed surface by applying a mixture of approximately 80% nickel by weight and 20% chromium by weight alloy powder to the surface of the seal, applying a thin coating of the polymer-graphite boron-nitride mixture to the bond coating, drying the polymer-graphite boron-nitride coating at approximately 250° to 300°F for a least 15 minutes, curing the coating at approximately 400° to 500° for approximately one-half hour to one hour and pressure laminating the coating at a temperature of approximately 500°F to 800°F for approximately one-half hour to one hour with a pressure of approximately 800 to 1,500 psi, and slowly cooling the coating and grinding the coating to a smooth surface finish.

3. A method for preparing a lubrication and sealing surface on a rotary ceramic regenerator seal, said seal having a flat seal surface made of chrome stainless steel, applying a bond coating to the seal surface, said bond coating comprising a nickel-chromium alloy powder, mixing a polyarylsulfone powder, boron nitride and graphite in the proportions by weight of approximately 40% to 20% to 40%, adding a solvent to the mixture to form a slurry, spreading the slurry into thin sheets, drying and pressure molding the thin sheet coating to the bond coating at an elevated temperature about 400° and below 700°, cooling the seal and the applied coating, and finish grinding the surface of the coating.

* * * * *